US012095143B2

(12) United States Patent
Kuo et al.

(10) Patent No.: US 12,095,143 B2
(45) Date of Patent: Sep. 17, 2024

(54) ANTENNA MODULE AND ELECTRONIC DEVICE

(71) Applicant: WISTRON NEWEB CORPORATION, Hsinchu (TW)

(72) Inventors: Li-Kai Kuo, Hsinchu (TW); Chun-Hsiang Chuang, Hsinchu (TW); Ri-Chang Wang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 167 days.

(21) Appl. No.: 18/066,376

(22) Filed: Dec. 15, 2022

(65) Prior Publication Data

US 2023/0378635 A1 Nov. 23, 2023

(30) Foreign Application Priority Data

May 18, 2022 (TW) ................................. 111118488

(51) Int. Cl.

*H01Q 1/24* (2006.01)
*H01Q 1/22* (2006.01)
*H01Q 1/38* (2006.01)
*H01Q 1/50* (2006.01)

(52) U.S. Cl.

CPC ............ *H01Q 1/2283* (2013.01); *H01Q 1/38* (2013.01); *H01Q 1/50* (2013.01)

(58) Field of Classification Search

CPC .......... H01Q 1/2283; H01Q 1/38; H01Q 1/50; H01Q 5/321; H01Q 5/328; H01Q 5/378; H01Q 1/245

See application file for complete search history.

(56) References Cited

U.S. PATENT DOCUMENTS

2012/0299781 A1* 11/2012 Lee .......................... H01Q 9/42 343/700 MS
2021/0013607 A1* 1/2021 Tai .......................... H01Q 1/48
2022/0069466 A1 3/2022 Chang

FOREIGN PATENT DOCUMENTS

CN 114122711 A 3/2022
TW 202127735 A 7/2021

* cited by examiner

*Primary Examiner* — David E Lotter
(74) *Attorney, Agent, or Firm* — McClure, Qualey & Rodack, LLP

(57) ABSTRACT

An antenna module and an electronic device including the antenna module are provided. The antenna module includes a radiating element, a first inductive element, a first capacitive element, a first feeding radiating element and a second feeding radiating element. The radiating element includes a first radiating branch, a second radiating branch and a third radiating branch, and the third radiating branch is connected between the first and second radiating branches. The first inductive element is connected between the second radiating branch and the third radiating branch. One end of the first capacitive element connected to the third radiating branch, and another end thereof is grounded. The first feeding radiation element is adjacent to the first radiating branch. The second feeding radiation element is adjacent to the second radiating branch. The first feeding radiation element and the first radiating branch are used to generate the first operating frequency band.

15 Claims, 6 Drawing Sheets

ANTENNA MODULE AND ELECTRONIC DEVICE

CROSS-REFERENCE TO RELATED PATENT APPLICATION

This application claims the benefit of priority to Taiwan Patent Application No. 111118488, filed on May 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module and an electronic device, and more particularly to an antenna module with a common structure and an electronic device having the antenna module.

BACKGROUND OF THE DISCLOSURE

Existing electronic devices, such as notebook computers, tend to utilize thin and light structural designs, and a frame of a screen is gradually minimized. In order to match the thin frame design, an antenna inside the electronic device is disposed close to the system terminal (that is, between the C part and the D part of a notebook computer). However, since the system terminal has many hardware components built therein, spaces that are available for antennas are limited, such that an isolation between the antennas is insufficient, and the antennas easily interfere with each other. In addition, the antennas disposed at the system terminal are usually positioned relatively close to a human body, so that a specific absorption rate (SAR) of electromagnetic wave energy needs to be further considered.

Therefore, improving a structural design of the existing electronic devices has become one of important issues in the related art.

SUMMARY OF THE DISCLOSURE

In response to the above-referenced technical inadequacies, the present disclosure provides an antenna module and an electronic device to address the issues of insufficient isolation and high SAR value due to an arrangement in which antennas are disposed close to the system terminal of the electronic device.

In one aspect, the present disclosure provides an antenna module, which is disposed on a circuit substrate. The antenna module includes a radiating element, a first inductive element, a first capacitive element, a first feeding radiating element and a second feeding radiating element. The radiating element includes a first radiating branch, a second radiating branch and a third radiating branch, and the third radiating branch is connected between the first radiating branch and the second radiating branch. The first inductive element is connected between the second radiating branch and the third radiating branch. One end of the first capacitive element is connected to the third radiating branch, and another end of the first capacitive element is grounded. The first feeding radiating element is configured to feed a first signal, and the first feeding radiating element is adjacent to the first radiating branch. The second feeding radiating element is configured to feed a second signal, and the second feeding radiating element is adjacent to the second radiating branch. The first feeding radiating element and the first radiating branch are used to generate a first operating frequency band, the second radiating branch is used to generate a second operating frequency band, the third radiating branch is used to generate a third operating frequency band, and the first operating frequency band, the second operating frequency band and the third operating frequency band are different from one another.

In another aspect, the present disclosure provides an electronic device, which includes a circuit substrate, a radiating element, a first inductive element, a first capacitive element, a first feeding radiating element and a second feeding radiating element. The radiating element includes a first radiating branch, a second radiating branch and a third radiating branch, and the third radiating branch is connected between the first radiating branch and the second radiating branch. The first inductive element is connected between the second radiating branch and the third radiating branch. One end of the first capacitive element is connected to the third radiating branch, and another end of the first capacitive element is grounded. The first feeding radiating element is configured to feed a first signal, and the first feeding radiating element is adjacent to the first radiating branch. The second feeding radiating element is configured to feed a second signal, and the second feeding radiating element is adjacent to the second radiating branch. The first feeding radiating element and the first radiating branch are used to generate a first operating frequency band, the second radiating branch is used to generate a second operating frequency band, the third radiating branch is used to generate a third operating frequency band, and the first operating frequency band, the second operating frequency band and the third operating frequency band are different from one another.

Therefore, in the antenna module and the electronic device provided by the present disclosure, by virtue of "the radiating element including the first radiating branch, the second radiating branch and the third radiating branch, and the third radiating branch been connected between the first radiating branch and the second radiating branch," and "one end of the first capacitive element been connected to the third radiating branch, and another end of the first capacitive element been grounded", two different antennas can be integrated into an antenna structure with a common structure, and an isolation can be improved by the capacitive element.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
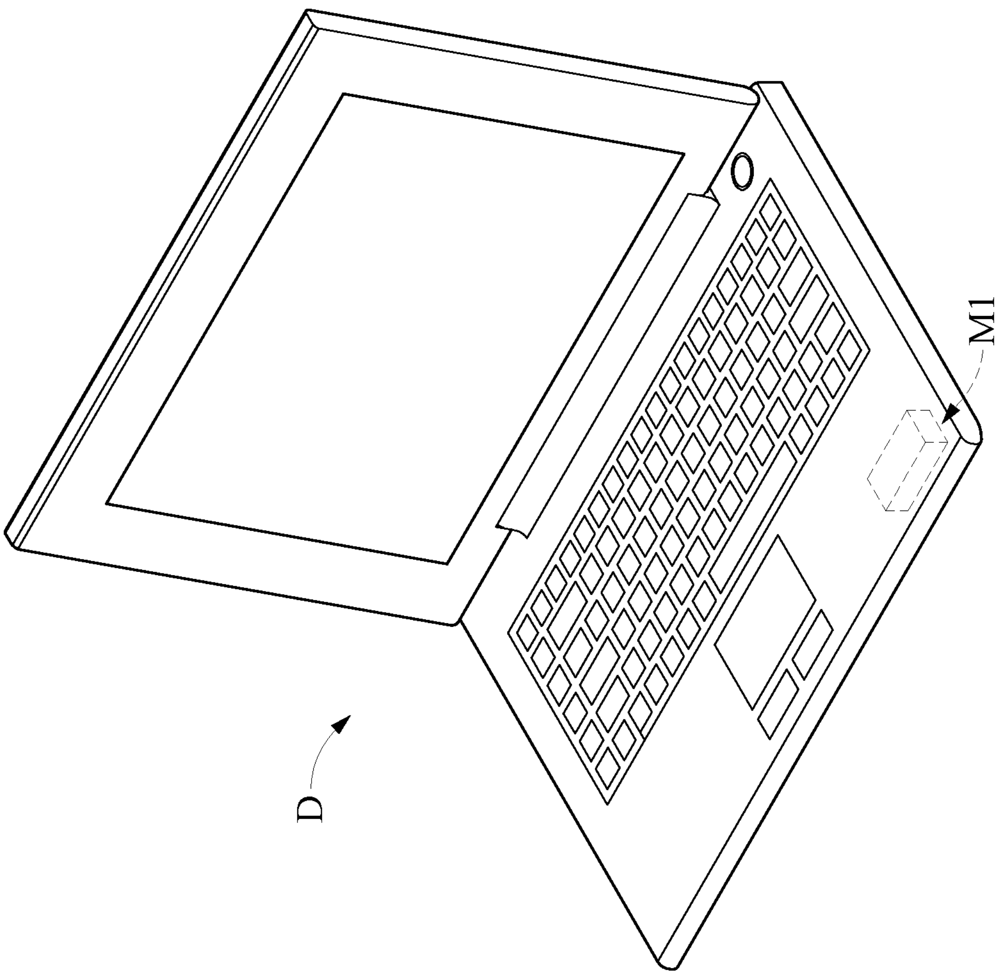
FIG. 1 is a schematic perspective view of an electronic device of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

In addition, the term “connect” or “connected” in the context of the present disclosure means that there is a physical connection between two elements and the two elements are directly or indirectly connected, and the term “couple” or “coupled” in the context of the present disclosure means that two elements are separated and have no physical connection therebetween, but means that an electric field energy generated by one of the two elements excites an electric field energy generated by the other of the two elements.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

In addition, “connected” in the context of the present disclosure means that there is a physical connection between two elements and the two elements are directly or indirectly connected, and “coupled” in the context of the present disclosure means that two elements are separated from each other without any physical connection, and also means that an electric field energy of one element is excited by an electric field energy generated by a current flowing in another element.

First Embodiment

Figure 2:
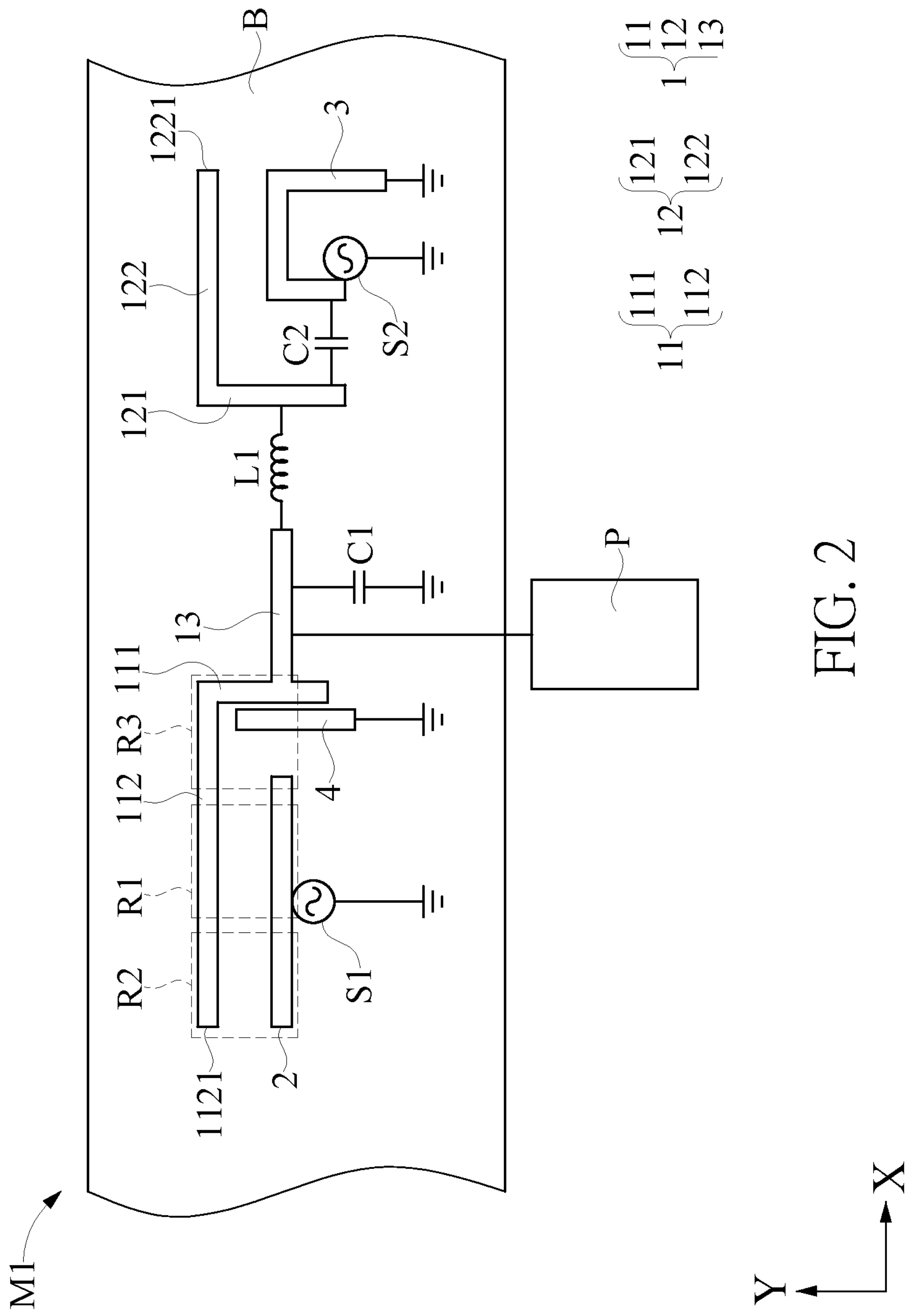
FIG. 2 is a schematic diagram of an antenna module according to a first embodiment of the present disclosure.

Reference is made to FIGS. 1 and 2, FIG. 1 is a schematic perspective view of an electronic device of the present disclosure, and FIG. 2 is a schematic diagram of an antenna module according to a first embodiment of the present disclosure. The present disclosure provides an electronic device D, which includes a circuit substrate B and an antenna module M1 disposed on the circuit substrate B. The antenna module M1 includes a radiating element 1, a first inductive element L1, a first capacitive element C1, a first feeding radiating element 2 and a second feeding radiating element 3, and the radiating element 1, the first inductive element L1, the first capacitive element C1, the first feeding radiating element 2 and the second feeding radiating element 3 are arranged on the circuit substrate B. The radiating element 1 includes a first radiating branch 11, a second radiating branch 12 and a third radiating branch 13. The third radiating branch 13 is connected between the first radiating branch 11 and the second radiating branch 12. For example, the circuit substrate B can be a flexible printed circuit board (FPCB), and the radiating element 1 can be a copper foil, and the present disclosure is not limited thereto.

Furthermore, the first radiating branch 11, the second radiating branch 12 and the third radiating branch 13 are arranged along a straight line parallel to an X-axis. The first radiating branch 11 includes a first section 111 and a second section 112, and the first section 111 is connected between the third radiating branch 13 and the second section 112. One end of the second section 112 is connected to the first section 111, and another end of the second section 112, that is, an open end 1121, extends along a negative X-axis direction. The second radiation branch 12 includes a third section 121 and a fourth section 122. One end of the fourth section 122 is connected to the third section 121, and another end of the fourth section 122, that is, an open end 1221, extends along a positive X-axis direction. The present disclosure is not limited to an extending direction of the fourth section 122. In other embodiments, the open end 1221 of the fourth section 122 can also extend along the negative X-axis direction. The first inductance element L1 is connected between the third section 121 of the second radiating branch 12 and the third radiating branch 13, one end of the first capacitive element C1 is connected to the third radiating branch 13, and the other end of the first capacitive element C1 is grounded.

As mentioned above, the first feeding radiating element 2 is connected to a first feeding element S1, and a first signal is fed to the first feeding radiating element 2 through the first feeding element S1. The first feeding radiating element 2 is adjacent to the first radiating branch 11, and the first feeding radiating element 2 and the first radiating branch 11 are separated from and coupled to each other to generate a first operating frequency band. The second feeding radiating element 3 is connected to a second feeding element S2, and a second signal is fed to the second feeding radiating element 3 through the second feeding element S2. The first feeding element S1 and the second feeding element S2 can be, for example, coaxial cables, but the present disclosure is not limited thereto. The second feeding radiating element 3 is adjacent to the second radiating branch 12. More specifically, the second feeding radiating element 3 is connected to the second radiating branch 12 and the third radiating branch 13. Therefore, the second radiating branch 12 is used to generate a second operating frequency band, and the third radiating branch 13 is used to generate a third operating frequency band. It should be noted that the second operating frequency band and the third operating frequency band are mainly generated by the second radiating branch 12 and the third radiating branch 13, respectively, but the second feeding radiating element 3 also assists in generating the second operating frequency band and the third operating frequency band. The first operating frequency band, the second operating frequency band and the third operating frequency band are different from each other. For example, the first operating frequency band ranges from 3300 MHz to 3900 MHz, the second operating frequency band ranges from 2400 MHz to 2500 MHz, and the third operating frequency band ranges from 5150 MHz to 7125 MHz. However, the present disclosure is not limited thereto.

It is worth mentioning that, in this embodiment, since the open end 1221 of the fourth section 122 extends along the positive X-axis direction, portions of the fourth section 122 of the second radiating branch 12 and the second feeding radiating element 3 that are parallel to each other are coupled. Through a coupling between the fourth section 122 and the second feeding radiating element 3, a radiating efficiency of the antenna module M1 at the second operating frequency band (2400 MHz to 2500 MHz) can be enhanced, that is, an antenna gain can be improved. In addition, there is also a coupling characteristic between the first feeding radiating element 2 and the ground, which can enhance a radiation efficiency of the antenna module M1 at the first operating frequency band (3300 MHz to 3900 MHz).

Furthermore, the first feeding radiating element 2 and the first radiating branch 11 are separated from each other and coupled with each other to generate multiple operating frequency bands. As shown in FIG. 2, a space between the first feeding radiating element 2 and the first radiating branch 11 can be divided into three coupling regions along the X-axis, namely a first coupling region R1, a second coupling region R2 and a third coupling region R3, respectively. As shown in FIG. 2, the first coupling region R1 is used to generate the first operating frequency band with a frequency range that ranges from 3300 MHz to 3900 MHz; the second coupling region R2 is used to generate a fourth operating frequency band with a frequency range that ranges from 1710 MHz to 2690 MHz; and the third coupling region R3 is used to generate a fifth operating frequency band with a frequency range that ranges from 4200 MHz and 5950 MHz.

Therefore, the first feeding element S1, the first feeding radiating element 2 and the first radiating branch 11 form a first antenna structure. The first antenna structure is a coupling antenna structure, which is used to generate a plurality of operating frequency bands, such as the first operating frequency band, the fourth operating frequency band, and the fifth operating frequency band. The second feeding element S2, the second feeding radiating element 3, the second radiating branch 12 and the third radiating branch 13 form a second antenna structure, and the second antenna structure is a planar inverted-F antenna (PIFA) antenna structure, which is used to generate the second operating frequency band and the third operating frequency band. However, the present disclosure is not limited thereto, and the first antenna structure and the second antenna structure can be of the same structure or different structures, which will be further described in the following embodiments.

In the antenna module M1, the first inductive element L1 and the first capacitive element C1 forms an impedance matching circuit, so as to adjust the operating frequency band, impedance matching, return loss value and/or radiation efficiency of the second antenna structure in a high frequency mode. For example, in the present disclosure, the high frequency mode refers to the third operating frequency band, that is, the frequency range from 5150 MHz to 7125 MHz, and the high frequency mode can be adjusted according to the following equation:

$$f_c=1/(2\pi\sqrt{LC});$$

where $f_c$ is a center frequency of a frequency band that ranges from 5150 MHz to 7125 MHz, L is an inductance value of the first inductive element L1, and C is a capacitance value of the first capacitive element C1.

For example, the capacitance value of the first capacitive element C1 is 22 pF, and the inductance value of the first inductive element L1 is between 1.8 nH and 33 nH. Therefore, under the circumstances that the capacitance value of the first capacitive element C1 remains unchanged, when the inductance value of the first inductance element L1 becomes larger, then $f_c$ becomes smaller, that is, the high frequency mode moves toward a low frequency region; on the contrary, when the inductance value of the first inductance element L1 becomes smaller, then $f_c$ becomes larger, that is, the high frequency mode moves to a high frequency region.

Further, under a design condition that the capacitance value of the first capacitive element C1 is 22 pF and the inductance value of the first inductive element L1 is between 1.8 nH and 33 nH, in addition to an impedance matching circuit, the first inductive element L1 and the first capacitive element C1 can further form a low pass filter (LPF), so as to improve an isolation between the first antenna structure and the second antenna structure, that is, to reduce mutual interference between signals generated by the two antenna structures. For example, since the fourth operating frequency band (1710 MHz to 2690 MHz) generated by the first antenna structure overlaps with the second operating frequency band (2400 MHz to 2500 MHz) generated by the second antenna structure, signals generated by the first antenna structure and the second antenna structure in an overlapping frequency band that ranges from 2400 MHz to 2500 MHz interfere with each other. Therefore, in the present disclosure, signals with a frequency above 2400 MHz are filtered out by the low-pass filter including the first inductive element L1 and the first capacitive element C1, and only signals with a frequency below 2400 MHz (the operating frequency band generated by the first antenna structure and the second antenna structure do not overlap below 2400 MHz) are allowed to pass, thereby filtering out the overlapping frequency range from 2400 MHz to 2500 MHz that would interfere with each other to improve the isolation.

Figure 3:
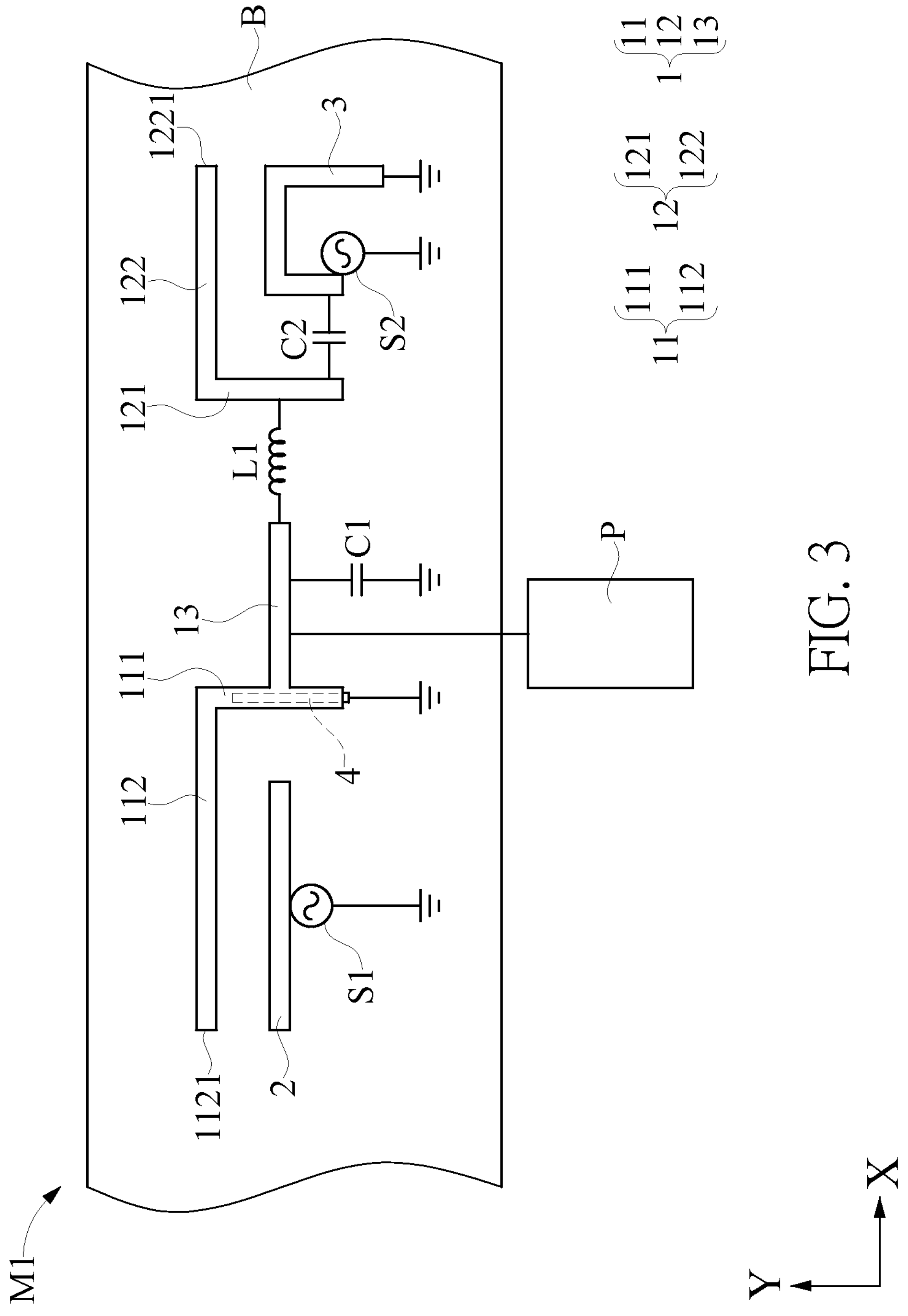
FIG. 3 is a schematic diagram of another implementation of the antenna module according to the first embodiment of the present disclosure.

Reference is made to FIG. 2, the antenna module M1 of this embodiment further includes a first grounding element 4. The first grounding element 4 and the radiating element 1 are located on the same surface of the circuit substrate B, and the first grounding element 4 and the first section 111 of the first radiating branch 11 are separated from and coupled to each other, but the present disclosure is not limited thereto. Reference is made to FIG. 3, which is a schematic diagram of another implementation aspect of the antenna module according to the first embodiment of the present disclosure. In FIG. 3, the first grounding element 4 and the radiating element 1 are respectively located on different surfaces of the circuit substrate B, such as an upper surface and a lower surface of the circuit substrate B. Therefore, the first ground element 4 and a projection area of the first section 111 of the first radiation branch 11 projected on the circuit substrate B at least partially overlap, so as to achieve a coupling between the first grounding element 4 and the first radiating branch 11.

Reference is made to FIG. 2, the antenna module M1 further includes a proximity sensing circuit P and a second capacitive element C2, the proximity sensing circuit P is connected to the third radiating branch 13, and the second capacitive element C2 is connected between the second feeding radiating element 3 and the third section 121 of the second radiating branch 12. In the present disclosure, the proximity sensing circuit P is connected to the third radiating branch 13 to use the radiating element 1 as a sensor pad to sense whether a human body is near the antenna module M1, such that a radiation power of the antenna module M1 can be adjusted to reduce the specific absorption rate (SAR).

Furthermore, since the first grounding element 4 is utilized in the antenna module M1, the first grounding element 4 and the first section 111 can be coupled with each other to form a coupling capacitor. The coupling capacitor can be used to block the signal generated by the proximity sensing circuit P from being directly grounded through the radiating element 1 (sensor pad).

In addition, the second capacitive element C2 can be used as a direct current (DC) block to prevent a DC signal generated by the proximity sensing circuit P from flowing into a system terminal through the second feeding element S2 and affecting or causing damage to other components inside the electronic device D, and prevent the DC signal generated by the proximity sensing circuit P from being directly grounded through the second feeding radiating element 3.

Second Embodiment

Figure 4:
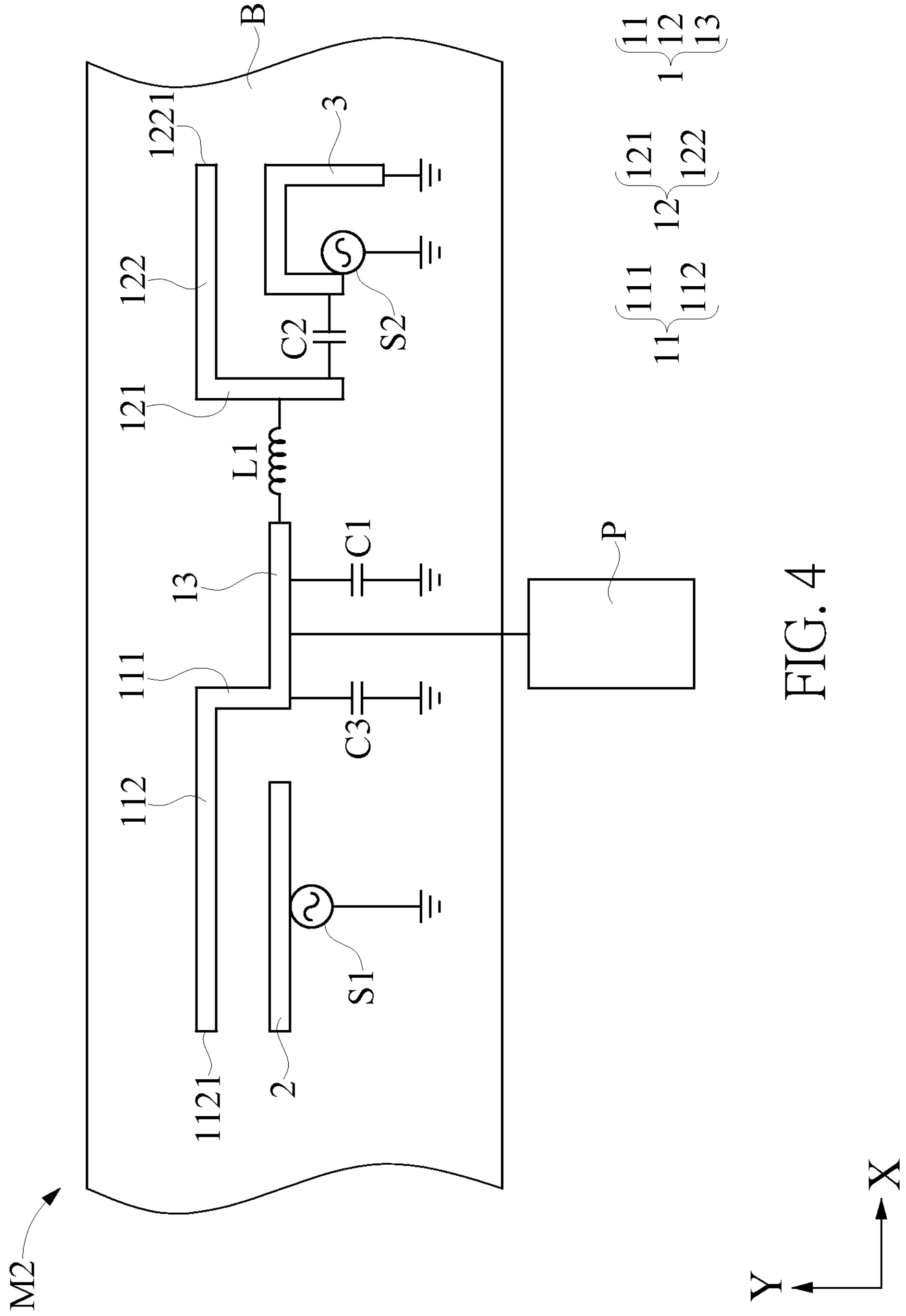
FIG. 4 is a schematic diagram of an antenna module according to a second embodiment of the present disclosure.

Reference is made to FIG. 4, which is a schematic diagram of an antenna module according to a second embodiment of the present disclosure. The second embodiment of the present disclosure provides an antenna module M2. The antenna module M2 has a structure similar to that of the antenna module M1 of the first embodiment, and the similar descriptions are not repeated herein. Compared with the first embodiment, the antenna module M2 does not have the first grounding element 4. The antenna module M2 further includes a third capacitive element C3, one end of the third capacitive element C3 is connected to the first section 111 of the first radiating branch 11, and the other end of the third capacitive element C3 is grounded. In the antenna module M2, the third capacitive element C3 is arranged to block signals generated by the proximity sensing circuit P from being directly grounded through the radiating element 1 (sensor pad).

Third Embodiment

Figure 5:
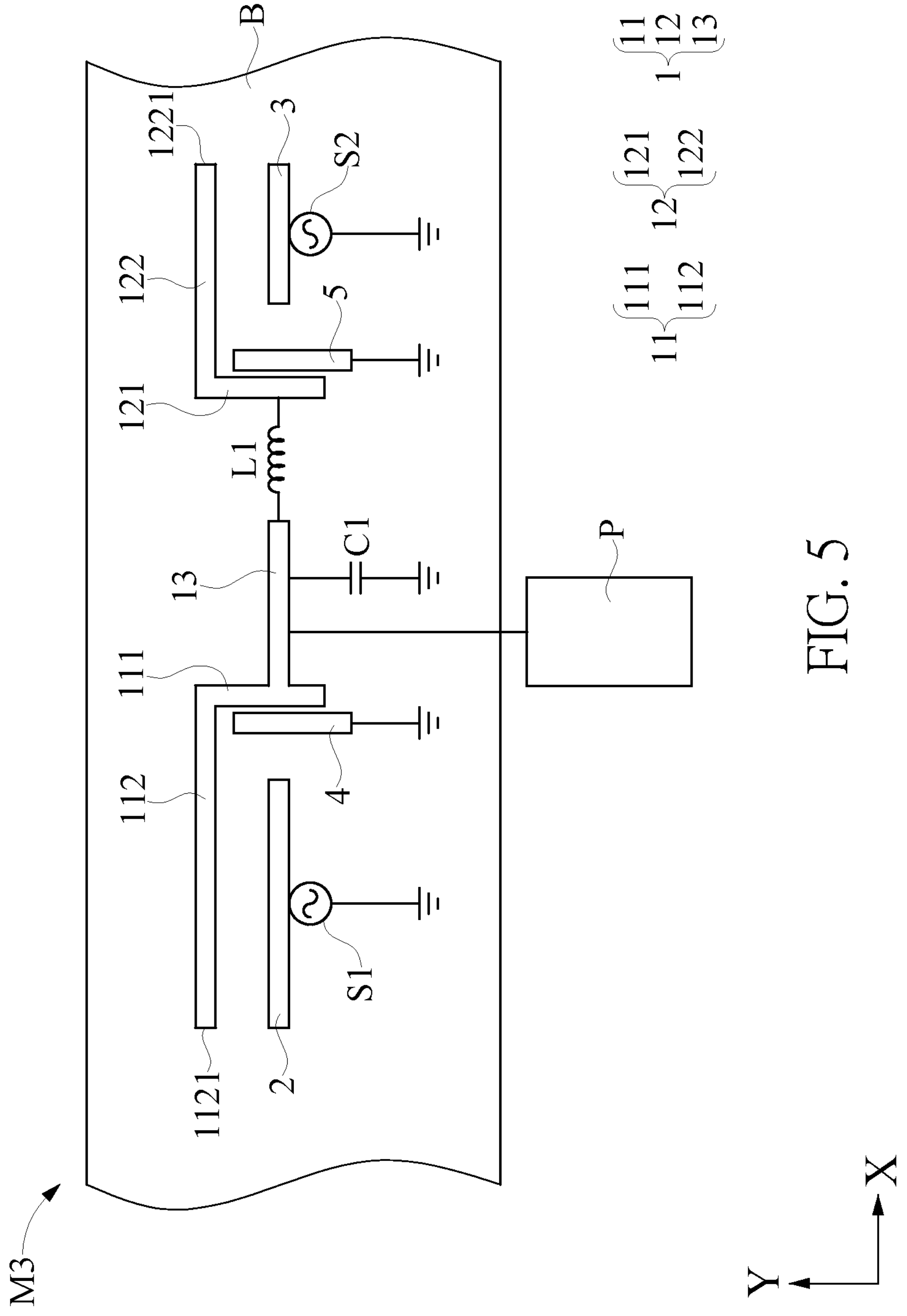
FIG. 5 is a schematic diagram of an antenna module according to a third embodiment of the present disclosure.

Reference is made to FIG. 5, which is a schematic diagram of an antenna module according to a third embodiment of the present disclosure. The third embodiment of the present disclosure provides an antenna module M3. The antenna module M3 has a structure similar to that of the antenna module M1 of the first embodiment, and the similar descriptions are not repeated herein. A difference between the antenna module M3 and the antenna module M1 of the first embodiment is that the second antenna structure of the antenna module M1 in FIG. 2 is a PIFA antenna structure, while the second antenna structure of the antenna module M3 in FIG. 5 is a coupling antenna structure, that is, the first antenna structure and the second antenna structure of the antenna module M3 are both coupling antenna structures. Specifically, a signal feeding manner between the second radiating branch 12 and the second feeding radiating element 3 of the antenna module M3 is different from that of the antenna module M1.

Based on the above, in the antenna module M1 of FIG. 2, the second feeding radiating element 3 is connected to the second radiating branch 12, and thus signals are directly fed from the second feeding radiating element 3 to the second radiating branch 12 and the third radiating branch 13, such that the second radiating branch 12 generates the second operating frequency band, and the third radiating branch 13 generates the third operating frequency band. However, in the antenna module M3 shown in FIG. 5, the second feeding radiating element 3 and the second radiating branch 12 are separated from and coupled to each other, the antenna module M3 further includes a second grounding element 5, and the grounding element 5 and the third section 121 of the second radiating branch 12 are separated from and coupled to each other. Therefore, since the second grounding element 5 is utilized in the antenna module M3, the second grounding member 5 and the third segment 121 are coupled with each other to form a coupling capacitor. The coupling capacitor can be used to block the signal generated by the proximity sensing circuit P from being directly grounded through the radiating element 1.

Fourth Embodiment

Figure 6:
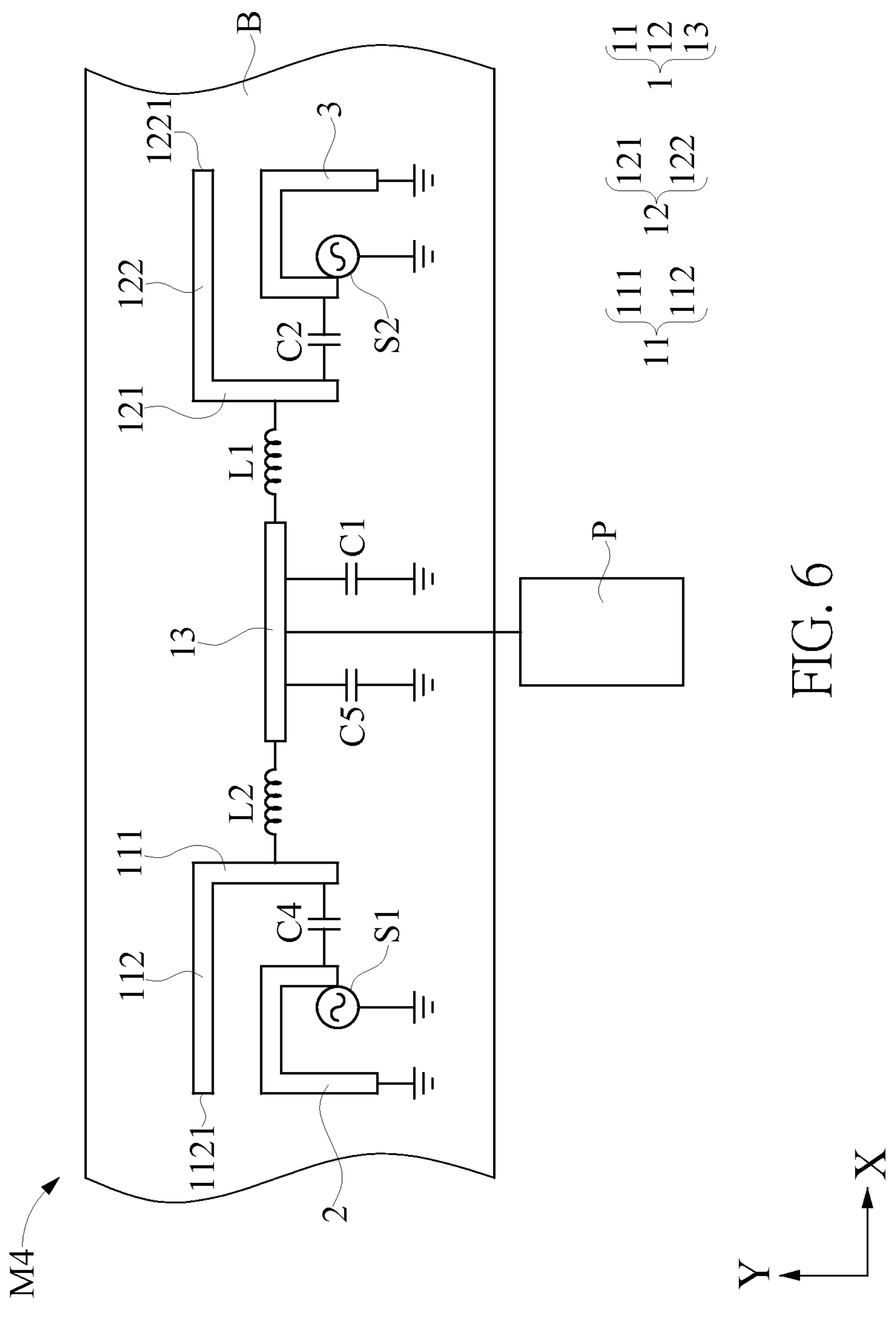
FIG. 6 is a schematic diagram of an antenna module according to a fourth embodiment of the present disclosure.

Reference is made to FIG. 6, which is a schematic diagram of an antenna module according to a fourth embodiment of the present disclosure. The fourth embodiment of the present disclosure provides an antenna module M4. The antenna module M4 has a structure similar to that of the antenna module M1 of the first embodiment, and the similar descriptions are not repeated. A difference between the antenna module M4 and the antenna module M1 of the first embodiment is that the first antenna structure of the antenna module M1 of FIG. 2 is a coupling antenna structure, while the first antenna structure of the antenna module M4 of FIG. 6 is a PIFA antenna structure, that is, the first antenna structure and the second antenna structure of the antenna module M4 are both PIFA antenna structures. Specifically, a signal feeding manner between the first feeding radiating element 2 and the first radiating branch 11 of the antenna module M4 is different from that of the antenna module M1.

Based on the above, in the antenna module M1 of FIG. 2, the first feeding radiating element 2 and the first radiating branch 11 are separated from each other, and thus the first feeding element S1 utilizes a coupling feeding manner to enable the first feeding radiating element 2 and the first radiating branch 11 to generate the first operating frequency band, the fourth operating frequency band and the fifth operating frequency band. However, in the antenna module M4 of FIG. 6, the first feeding radiating element 2 is connected to the first radiating branch 11, and the antenna module M4 further includes a second inductive element L2, a fourth capacitive element C4 and a fifth capacitive element C5. The second inductive element L2 is connected between the first section 111 of the first radiating branch 11 and the third radiating branch 13. The fourth capacitive element C4 is connected between the first feeding radiating element 2 and the first section 111 of the first radiating branch 11. One end of the fifth capacitive element C5 is connected to the third radiation branch 13 and the other end of the fifth capacitive element C5 is grounded, and the proximity sensing circuit P is located between the first capacitive element C1 and the fifth capacitive element C5.

Therefore, in the antenna module M4, a low pass filter (LPF) can include the second inductive element L2 and the fifth capacitive element C5 to improve an isolation between the first antenna structure and the second antenna structure, and the fourth capacitive element C4 can be used as a DC block to prevent a DC signal generated by the proximity sensing circuit P from flowing into the system through the first feeding element S1 and affecting or damaging other components inside the electronic device D.

Beneficial Effects of the Embodiments

In conclusion, in the antenna modules M1-M4 and the electronic device D provided by the present disclosure, by virtue of "the radiating element 1 including the first radiating branch 11, the second radiating branch 12 and the third radiating branch 13, and the third radiating branch 13 been connected between the first radiating branch 11 and the second radiating branch 12," and "one end of the first capacitive element C1 been connected to the third radiating branch 13, and another end of the first capacitive element C1 been grounded", two same or different antennas can be integrated into an antenna structure with a common structure, and an isolation can be improved by the capacitive element.

Furthermore, in the present disclosure, since the first radiating branch 11, the second radiating branch 12 and the third radiating branch 13 are arranged along a straight line parallel to the X-axis, the radiation element 1 can cover a wider range. Therefore, the radiating element 1 can be used as a sensor pad for detecting SAR in a larger sensing range and better sensitivity.

Further, in the present disclosure, inductive elements and capacitive elements (the first inductive element L1, the first capacitive element C1, the second inductive element L2 and the fifth capacitive element C5) can further form a low pass filter, so as to improve the isolation between the first antenna structure and the second antenna structure, that is, to reduce mutual interference between signals generated by the two antenna structures.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna module disposed on a circuit substrate, the antenna module comprising:

a radiating element including a first radiating branch, a second radiating branch and a third radiating branch, wherein the third radiating branch is connected between the first radiating branch and the second radiating branch;

a first inductive element connected between the second radiating branch and the third radiating branch;

a first capacitive element, wherein one end of the first capacitive element is connected to the third radiating branch, and another end of the first capacitive element is grounded;

a first feeding radiating element configured to feed a first signal, wherein the first feeding radiating element is adjacent to the first radiating branch; and a second feeding radiating element configured to feed a second signal, wherein the second feeding radiating element is adjacent to the second radiating branch;

wherein the first feeding radiating element and the first radiating branch are used to generate a first operating frequency band, the second radiating branch is used to generate a second operating frequency band, the third radiating branch is used to generate a third operating frequency band, and the first operating frequency band, the second operating frequency band and the third operating frequency band are different from one another.

2. The antenna module according to claim 1, further comprising a second capacitive element, the second capacitive element being connected between the second feeding radiating element and the second radiating branch.

3. The antenna module according to claim 2, wherein the first feeding radiating element and the first radiating branch are separated from each other and coupled to each other.

4. The antenna module according to claim 3, further comprising a second inductive element, a fourth capacitance element and a fifth capacitance element, wherein the second inductive element is connected between the first radiating branch and the third radiating branch, the fourth capacitive element is connected between the first feeding radiating element and the first radiating branch, one end of the fifth capacitive element is connected to the third radiating branch, and another end of the fifth capacitive element is grounded.

5. The antenna module according to claim 3, further comprising a first grounding element, wherein the first grounding element and a section of the first radiating branch are separated from each other and coupled to each other.

6. The antenna module according to claim 3, further comprising a third capacitive element, wherein one end of the third capacitive element is connected to a section of the first radiating branch, and another end of the third capacitive element is grounded.

7. The antenna module according to claim 1, wherein the second feeding radiating element and the second radiating branch are separated from and coupled to each other.

8. The antenna module according to claim 7, further comprising a second grounding element, wherein the second grounding element is separated from and coupled to a section of the second radiating branch.

9. The antenna module according to claim 1, further comprising a proximity sensing circuit connected to the third radiating branch.

10. The antenna module according to claim 1, wherein the first radiating branch, the second radiating branch and the third radiating branch are arranged along a straight line.

11. An electronic device, comprising:

a circuit substrate;

a radiating element disposed on the circuit substrate, wherein the radiating element includes a first radiating branch, a second radiating branch and a third radiating branch, and the third radiating branch is connected between the first radiating branch and the second radiating branch;

a first inductive element disposed on the circuit substrate and connected between the second radiating branch and the third radiating branch;

a first capacitive element disposed on the circuit substrate, wherein one end of the first capacitive element is connected to the third radiating branch, and another end of the first capacitive element is grounded;

a first feeding radiating element disposed on the circuit substrate and configured to feed a first signal, wherein the first feeding radiating element is adjacent to the first radiating branch; and a second feeding radiating element disposed on the circuit substrate and configured to feed a second signal, wherein the second feeding radiating element is adjacent to the second radiating branch;

wherein the first feeding radiating element and the first radiating branch are used to generate a first operating frequency band, the second radiating branch is used to generate a second operating frequency band, the third radiating branch is used to generate a third operating frequency band, and the first operating frequency band, the second operating frequency band and the third operating frequency band are different from one another.

12. The electronic device according to claim 11, wherein the first feeding radiating element and the first radiating branch are separated from each other and coupled to each other.

13. The electronic device according to claim 12, further comprising a first grounding element, wherein the first grounding element and a section of the first radiating branch are separated from each other and coupled to each other.

14. The electronic device according to claim 11, further comprising a second capacitive element, the second capacitive element being connected between the second feeding radiating element and the second radiating branch.

15. The electronic device according to claim 11, further comprising a proximity sensing circuit connected to the third radiating branch.

* * * * *